Sept. 5, 1933.                    C. W. MABEY                    1,925,265
                                DEEP FAT COOKER
                              Filed Aug. 14, 1931                2 Sheets-Sheet 1
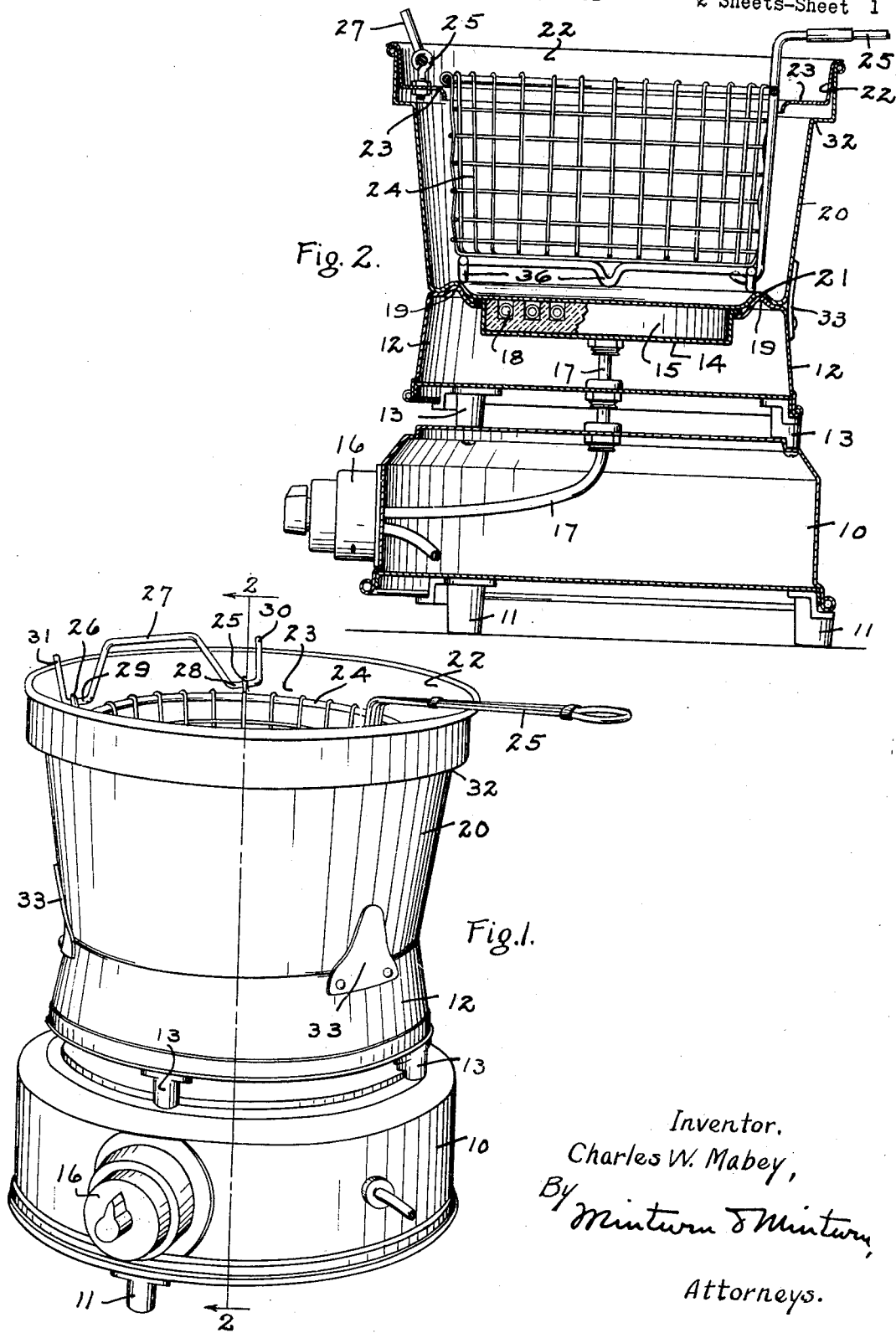
Inventor,
Charles W. Mabey,
By Minturn & Minturn,
Attorneys.

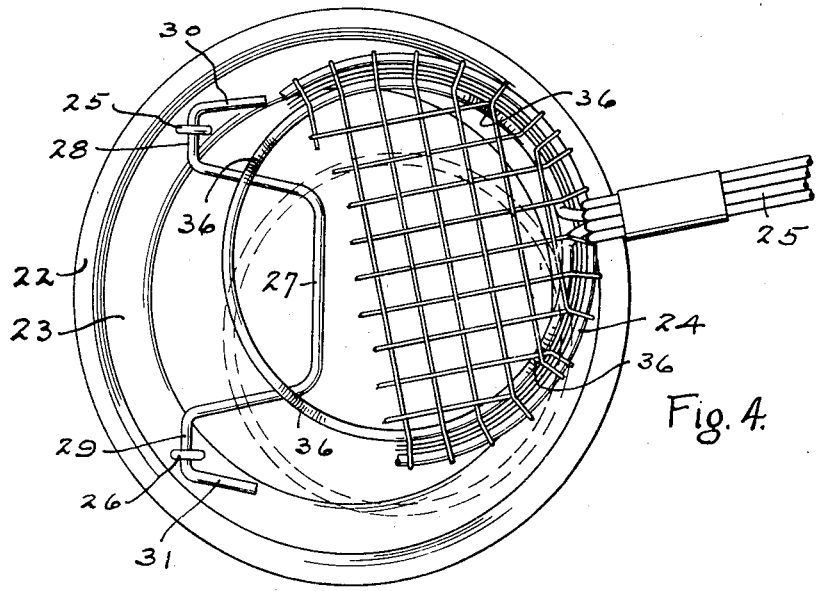
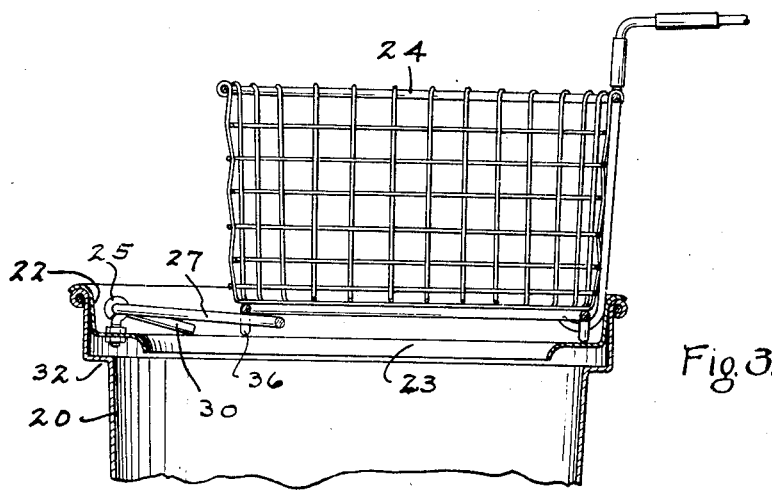

Patented Sept. 5, 1933

1,925,265

UNITED STATES PATENT OFFICE 1,925,265

DEEP FAT COOKER

Charles W. Mabey, Indianapolis, Ind., assignor to Mabey Electric and Manufacturing Company, Indianapolis, Ind.

Application August 14, 1931. Serial No. 557,063

14 Claims. (Cl. 219—43)

This invention relates to the art of electrically heated cookers and particularly to a deep fat cooker.

An object of the invention is to provide an oil or fat container so formed that foaming over of the heated oil therein will be prevented under ordinary circumstances and that will fit over an electrical heating element in such a manner that there may be no draft of air across the under side of the container and that will prevent oil which may over-flow and run down the sides of the container from reaching the electrical heating element.

An object of the invention is to provide a cooker that may be placed upon a table without causing damage thereto by reason of the particular heating insulation means provided.

An object of the invention is to provide a cooker that may be readily disassembled for cleaning and that will permit a low cost of production.

A further object of the invention is to provide means in the container for positioning a basket therein in a submerged position as well as in a raised position for draining.

A still further object of the invention is to provide an attachment for the container which will support the basket in a draining position whereby the basket is well supported from its under side and oil or grease draining therefrom will be directed back into the container all without danger of the basket being accidentally shifted or turned over.

These and other objects such as the particular combination of elements associated together in the accompanying claims to accomplish the foregoing objects will become apparent in the following description of the invention as illustrated by the accompanying drawings, in which Fig. 1 is a front perspective view of the cooker embodying my invention;

Fig. 2, a vertical diametrical section through the container on the line 2—2 in Fig. 1;

Fig. 3, a detail in vertical elevation showing the basket in the raised position; and Fig. 4, a top plan view of the cooker with the basket in the raised position.

Like characters of reference indicate like parts in the several views in the drawings.

I form a hollow drum-like base 10 supported by legs 11 to have the under and top sides of the base entirely enclosed and spaced apart an appreciable distance by the cylindrical side wall. I mount a second drum 12 in spaced relation to and above the drum 10 on the posts 13, the under sides of which are secured to the top side of the drum 10. This drum 12 is entirely enclosed across its bottom and has its upper side provided with an opening therethrough into which is set a pan 14 which carries a heating element 15. A suitable control switch 16 is mounted on the side of the base 10 and wires therefrom lead through a cable 17 out through the upper side of the base 10 and through the under side of the drum 12 to the element 15, which element is formed in the usual manner by positioning resistance wires 18 about a porcelain or vitrified base all in the usual manner well known to those versed in the art.

The upper side of the drum 12 is provided with an annular rib 19 projecting upwardly between the top of the side wall of the drum 12 and the outer edge of the pan 14.

I form a container 20 to have an annular groove 21 in its under side adapted to fit snugly over the rib 19 whereby the under side of the container is permitted to rest in close proximity to the upper side of the heating element 15 and a seal is provided between the container and the drum 12 about the element to prevent drafts of air passing between the container and the drum 12 and also to prevent any grease or oil from passing inwardly from the outer side of the container across the bottom thereof onto the element 15. The upper portion of the container 20 is flared outwardly and has its extreme upper end abruptly expanded outwardly from a shoulder 32 whereby a greatly increased volume is had should the heated oil or grease within the container tend to foam and rise.

A ring 22 is provided to be loosely inserted within the upper end of the container 20 and has an inwardly extending apron 23 carried somewhat above the shoulder 32, the inner edge of which apron defines a circular opening through which a basket 24 may be readily dropped centrally of the container 20 and thus retained in position by means of the inner edge of the apron 23 being substantially in contact around about the upper part of the basket. The height of the basket 24 is such that its upper edge terminates just above the apron 23 so that should any of the contents carried by the basket 24 be accidentally spilled over on the apron 23 such contents may be readily scraped back in the basket 24 without being dropped to within the container 20 outside of the basket.

The basket 24 is provided with a suitable handle 25 and a supporting wire about the under side of the basket is bent downwardly at intervals to form supporting feet 36 which space the under side of the basket upwardly from the bottom of the container 20 when the basket is positioned therein. The basket 24 is of the usual woven wire type permitting free access of the heated oil or grease therethrough. At one side of the ring 22 I fix two eye bolts 25 and 26 in spaced apart relation to extend vertically upwardly from the apron 23. I form a bail-like member 27 to have a centrally disposed straight section from the outer ends of which the member is bent angularly therefrom to extend in straight lines and thence bent outwardly to have straight sections 28 and 29 turned parallel to the straight central portion and to rockably pass through the eyes 25 and 26 respectively. From the outer ends of the sections 28 and 29 beyond the eyes though which they pass, the ends of the member 27 are turned sharply back to form the retaining legs 30 and 31 respectively, all of the bent and straight portions of the member 27 being within a common plane, with the exception of the legs 30 and 31 being bent out of that plane somewhat downwardly as the member 27 may be swung over the container 20.

The member 27 is rocked to the upper position as indicated in Fig. 1 when the basket 24 is to be placed in the container 20. When the basket 24 is to be lifted and the oil or grease to be drained therefrom, the basket 24 is first raised and the member 27 is then dropped downwardly and over the ring 22 where the member 27 is held in substantial horizontally disposed position by reason of the legs 30 and 31 contacting with the upper side of the apron 23. The above indicated straight central portion of the member 27 is of sufficient length to position the basket 24 when in the draining position to retain and support the basket about the ring 22 so as to prevent accidental displacement or overturning of the basket. The member 27 is so proportioned so as to extend between any two adjacent feet 36 when the opposite side of the basket rests upon the apron 23. Even though the basket may be shifted about from the solid line position to the dash line position, Fig. 4, the feet 36 betwen which the bail 27 extends so guide the basket that it can not have the opposite sides shifted from off the apron 23.

Of course by raising the basket 24, the bail 27 may be lifted and rocked to the outer position to be out of the way to permit the basket 24 to be lowered through the ring 22 down to within the container 20. With the basket 24 removed, the bail 27 may be used to lift the ring 22 from off of the container 20. It is to be noted that by reason of the ring 22 being of the conformation above described, a space is left between the under side of the apron 23 and above the shoulder 32 which provides a space into which foaming grease may expand and be somewhat controlled so as to prevent overflowing by reason of the fact that the ring 22 fits sufficiently close within the upper end of the container to prevent the foaming grease from passing readily therebetween and yet permitting the ring 22 to be easily lifted from the container. As an additional means of safety, I provide brackets 33 about the drum 12 to extend upwardly about the lower part of the container 20. The container 20 may be easily positioned between the brackets 33 which serve as means for guiding the container 20 into position to have the groove 21 come into position over the rib 19.

While I have here shown and described my invention in the form as now best known to me, it is obvious that structural changes may be made without departing from the spirit of the invention and I, therefore, do not desire to be limited to that precise form beyond the limitations of the following claims.

I claim:

1. In a cooker, an insulating base, an insulating drum secured to and spaced above the base, a horizontal heating element carried in the upper side of the drum, a rib projecting upwardly from the drum around the element, and a cooking vessel having a groove in its underside nesting over said rib when the cooking vessel is placed upon the drum.

2. In a cooker, a drum base, a second drum in spaced relation to and above the drum base having an opening through its top and a corrugation in the top around the opening, a pan closing said opening, a heating element in the pan and a cooking vessel supported by and contacting the second drum and covering the pan and having a corrugation nesting with that of the second drum.

3. In a cooker, a lower drum base, an upper drum secured to and spaced above the base, a heating element carried in the upper side of the upper drum, a rib projecting upwardly from the upper drum around the element, and a cooking vessel having a groove in its underside nesting over said rib, and a cooking vessel having a groove in its under side of the same conformation as said rib whereby said vessel placed over said element has said groove nesting over said rib to form a seal about said element.

4. In a cooker, a lower drum base, an upper drum secured to and spaced above the base, a heating element carried in the upper side of the upper drum, a rib projecting upwardly from the upper drum around the element, and a cooking vessel having a groove in its underside adapted to nest over said rib, and a cooking vessel having a groove in its under side of the same conformation as said rib whereby said vessel placed over said element has said groove nesting over said rib to form a seal about said element, and brackets fixed to the upper drum to guide said vessel in positioning said groove over said rib.

5. In a deep fat cooker, a vessel adapted to contain fat, said vessel being abruptly expanded to form a shoulder and continued upwardly to form an expanded mouth, a ring fitting over the expanded upper end of the vessel, said ring projecting downwardly within the vessel a spaced distance above the shoulder and having an apron extending inwardly over the shoulder and vessel from the lower end of the ring, and a basket adapted to be placed in said vessel through a central opening through said apron.

6. In a deep fat cooker, a vessel adapted to contain fat, a ring fitting over the upper end of the vessel, said ring projecting downwardly within the vessel a distance and having an apron extending inwardly over the vessel from the lower end of the ring, and a basket placed in said vessel through a central opening through said apron, a drum supporting said vessel, a heating element on the upper side of the drum, and means between the drum and the vessel preventing grease flowing down the sides of the vessel from flowing over said drum onto said element.

7. In a deep fat cooker, a vessel adapted to contain fat, a ring fitting over the upper end of the vessel, said ring projecting downwardly within the vessel a distance and having an apron extending inwardly over the vessel from the lower end of the ring, and a basket placed in said vessel through a central opening through said apron, a drum supporting said vessel, a heating element on the upper side of the drum, and means between the drum and the vessel preventing grease flowing down the sides of the vessel from flowing over said drum onto said element, said means comprising a raised portion on said drum about said element and a lowered portion about the underside of said vessel on the outside of said drum raised portion, said drum being sloped away outwardly from said portions.

8. In a deep fat cooker, a fat container, a basket adapted to be placed in the container, an apron around the upper end of the container projecting inwardly thereover a distance, a bail rockably secured to the apron, said bail being proportioned to permit its being turned to a horizontal position over the container and there supported by the said apron and extended under said basket to support it when the basket is rested on said apron by one side.

9. In a deep fat cooker, a fat container, a basket adapted to be placed in the container, an apron around the upper end of the container projecting inwardly thereover a distance, a bail rockably secured to the apron, said bail being proportioned to permit its being turned to a horizontal position over the container and there supported by the said apron and extended under said basket to support it when the basket is rested on said apron by one side, and legs on the under side of the basket, said bail being formed to project to between adjacent basket legs whereby the bail through the cooperation of said legs abutting the bail will support and retain the basket while being shifted around on said apron, said legs limiting the shifting of the basket by contact with the bail.

10. In a deep fat cooker, a fat container, a bail rockably supported at one side only thereof, means for retaining the bail over the container when rocked to substantially a horizonal position, and a basket placed in the container and to be supported by the bail when lifted from the container to drain.

11. For a fat container in a deep fat cooker, a top ring nested in the container, an inwardly extending apron on the ring, and a bail rockably secured to the ring, said bail having legs contacting said apron to limit the travel of the bail at a substantially horizontal position when turned inwardly.

12. For a fat container in a deep fat cooker, a top ring nested in the container, an inwardly extending apron on the ring, and a bail rockably secured to the ring, said bail having legs contacting said apron to limit the travel of the bail at a substantially horizontal position when turned inwardly over the container, and a basket passing through the opening defined by the inner edges of said apron, said bail when turned to the horizontal position over the container forming a rest for one side of the basket when the other side of the basket is placed on said apron.

13. For a fat container in a deep fat cooker, a top ring nested in the container, an inwardly extending apron on the ring, and a bail rockably secured to the ring, said bail having legs contacting said apron to limit the travel of the bail at a substantially horizontal position when turned inwardly over the container, and a basket passing through the opening defined by the inner edges of said apron, said bail when turned to the horizontal position over the container forming a rest for one side of the basket when the other side of the basket is placed on said apron, and legs extending from the under side of said basket receiving said bail therebetween to serve as stops to limit the shifting of the basket around said apron.

14. In a deep fat cooker, a fat container having an enlarged upper end formed by extending the wall thereof abruptly outwardly below said end to form a shoulder, a removable ring fitted within the enlarged container end, and an apron extending inwardly from the underside of the ring at a distance above said shoulder leaving a space therebetween.

CHARLES W. MABEY.